June 21, 1932. W. C. STUMPF 1,864,262
SOIL CHANGING PLOW
Filed March 7, 1931 3 Sheets-Sheet 1

Inventor
W. C. Stumpf
Attorney

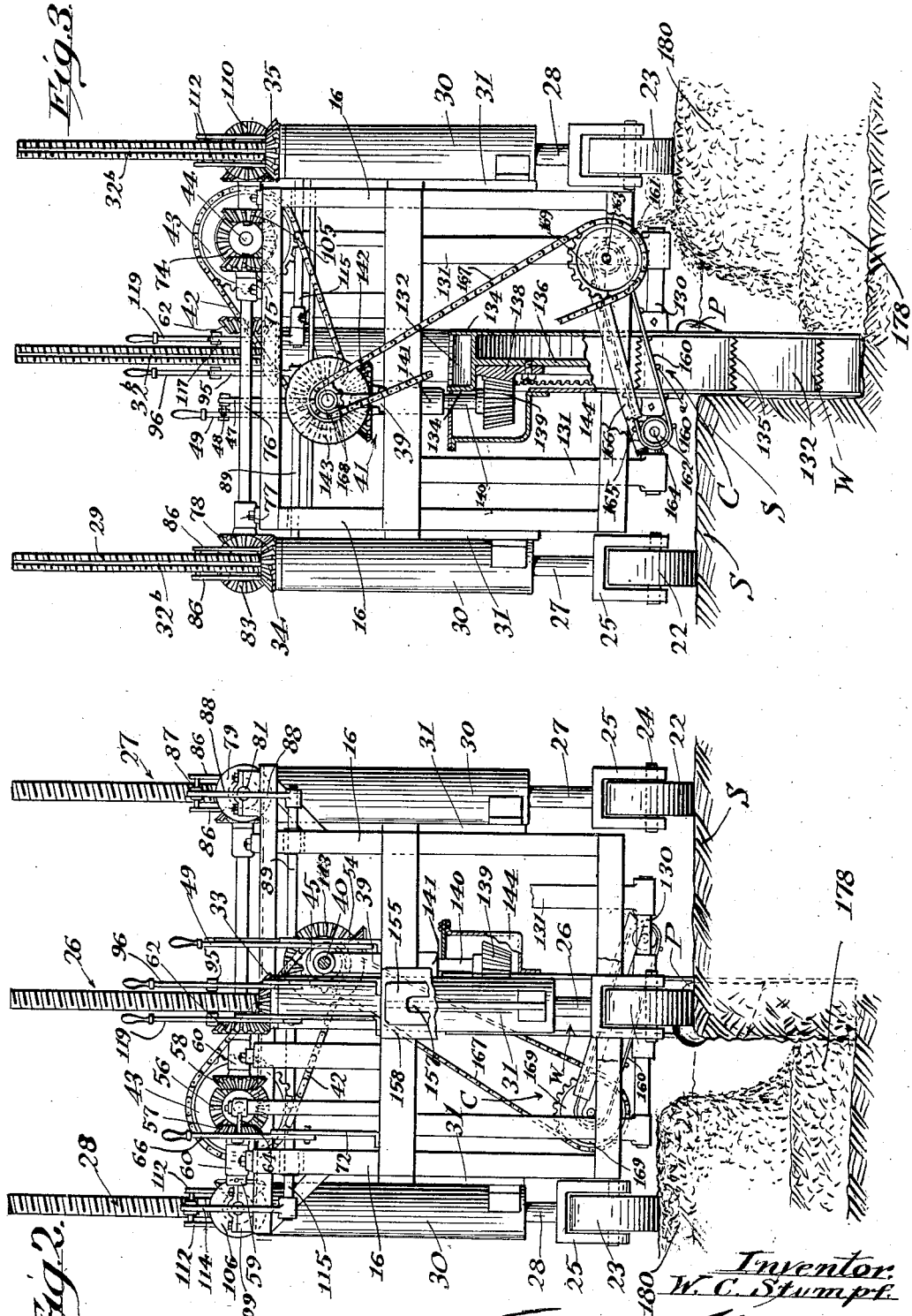

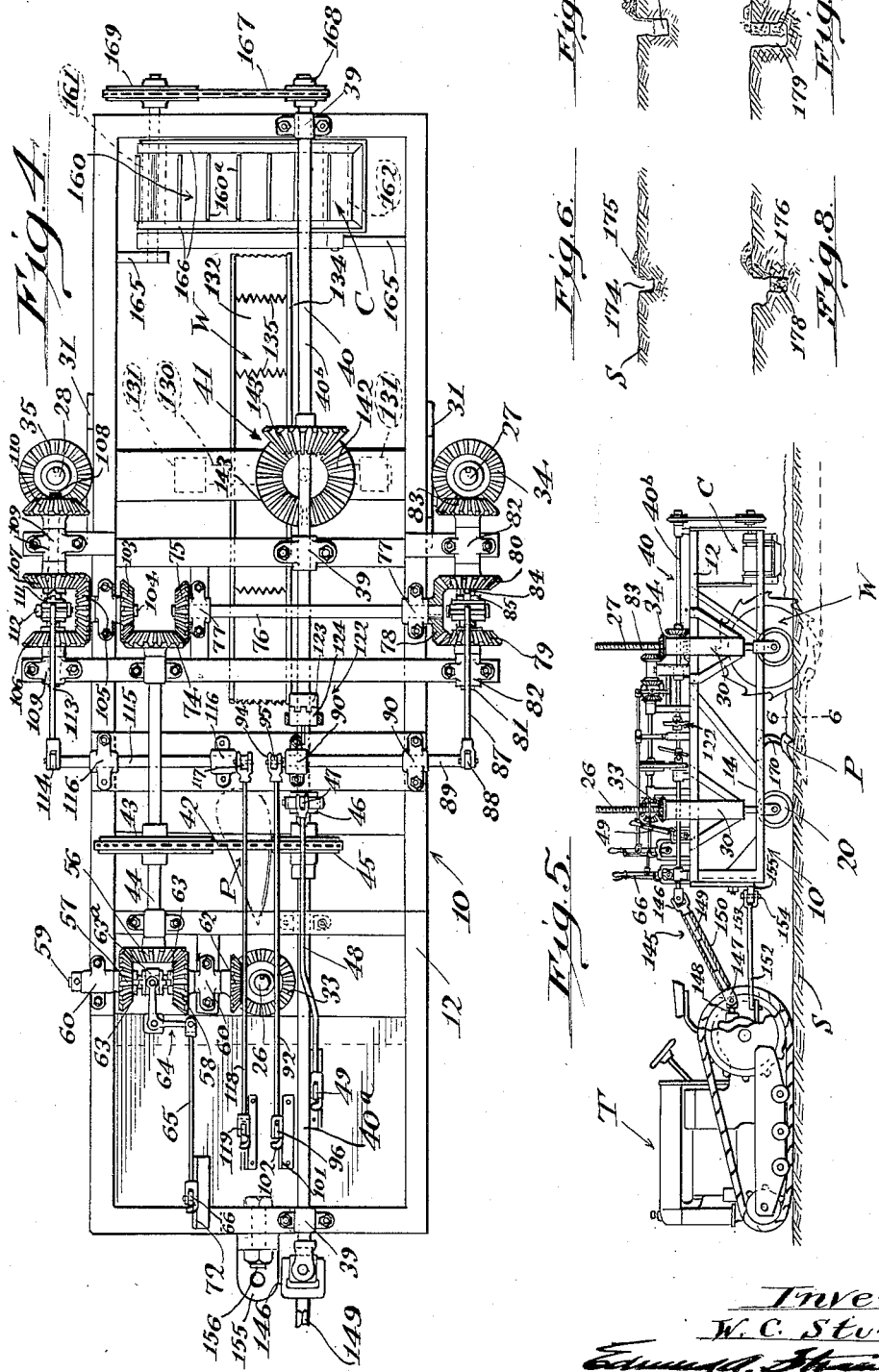

Patented June 21, 1932

1,864,262

UNITED STATES PATENT OFFICE

WALTER C. STUMPF, OF LOS ANGELES, CALIFORNIA

SOIL CHANGING PLOW

Application filed March 7, 1931. Serial No. 520,796.

This invention relates generally to agricultural implements, more specifically to an apparatus of this character for reconditioning farm lands, and will be hereinafter referred to as a soil changing plow.

At the present time large areas of farm lands have been rendered practically unproductive due to the top soil becoming infested with bugs, weeds, etc., and from intensive cultivation.

The object of the present invention is to provide an implement constructed in such a manner that it will remove the top soil (to required depth) place it below the surface, and cover it with soil removed therebelow.

The apparatus according to the present invention consists of a plow of usual construction, an excavator preferably in the form of a wheel plow disposed rearwardly thereof, and a cross conveyor, the above parts being mounted on a portable frame adapted to be drawn by a tractor.

During the first round or path traversed, the plow forms a furrow in the top soil, and turns it to one side, the wheel plow digs to greater depth into the bottom soil, and discharges it onto the conveyor which then discharges it on top of the soil turned over by the plow. Thereafter, the plow turns the top soil into the furrow formed by the wheel plow during the preceding round, the wheel plow then removes the bottom soil and discharges it onto the conveyor which in turn deposits it on top of the soil turned into the furrow by the plow.

Other objects and advantages will be apparent from the following description, reference being had to the accompanying drawings, in which—

Fig. 2 is a front elevation taken in the direction indicated by the arrow 2 of Fig. 1.

Fig. 3 is a rear elevation, parts being broken away and shown in section, the view also illustrating the result of the operation of the apparatus.

Fig. 4 is a top plan view.

Fig. 5 is a side elevation of the apparatus on a reduced scale operatively connected to a tractor.

Fig. 6 is a diagrammatical sectional view taken substantially on line 6—6 of Fig. 5 looking forwardly illustrating the action of the plow of the apparatus during the first round of operation.

Fig. 7 is a view analogous to Fig. 6 showing the soil removed by the digging member, and placed on top of the soil turned over by the plow.

Fig. 8 is a view showing the action of the plow during the second round of operation, viz., turning the top soil into the bottom of the furrow formed by the wheel plow during the first round.

Fig. 9 is a view analogous to Fig. 8 showing the soil removed by the wheel plow placed over the top soil.

Figure 1:
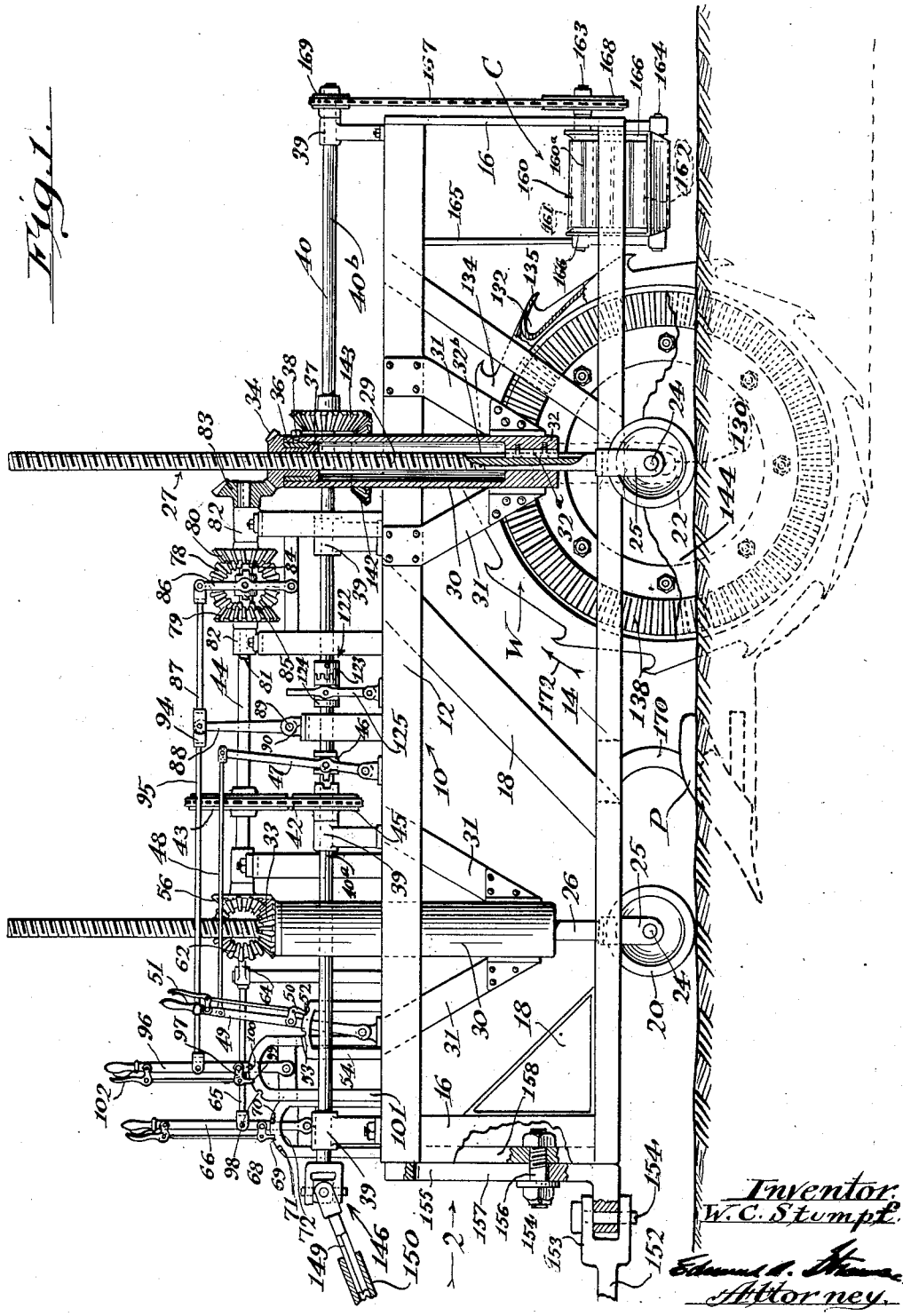
Fig. 1 is a side elevation of the soil changing plow, parts being broken away and shown in section.

Referring more specifically to the drawings, 10 designates a frame consisting of upper and lower horizontal members 12 and 14 respectively, joined together at each corner by vertical members 16, and reinforced by suitable struts 18.

Frame 10 is supported by a center wheel 20, and a pair of side wheels 22 and 23, each of which is adjustably mounted in order that said frame may be maintained in an upright position, and to regulate the depth of the furrow formed in the soil designated at —S— by the plow —P— and wheel plow or excavator —W— in a manner hereinafter more fully described.

Center wheel 20, and side wheels 22 and 23 are rotatably mounted on individual axles 24 carried by yokes or clevises 25 formed integral with or secured to the lower end of rods 26, 27 and 28 respectively, screw threaded as indicated at 29, which extend through vertically disposed guide members 30 rigidly mounted in the frame. Each guide member 30 is preferably in the form of a cylindrical housing held in place by suitable bracing 31 secured thereto, and to the upper members of the frame. Rods 26, 27 and 28 are slidably mounted in bearings 32 formed in the lower end of their respective guide members, and are held against rotation by feather keys 32$^a$ engaging seats 32$^b$ formed in said rods, the threads on the rods being preferably square shaped in cross section so that they may slide freely through the bearing.

Mounted on the rods 26, 27 and 28, and engaging the threads thereon are bevel gears 33, 34 and 35 respectively. These gears are rotatably mounted in the upper end of the members 30, and are held in position against sliding movement by a sleeve 36 mounted on the hub of each gear, and engaging a flange 37 formed on the lower end thereof, each sleeve in turn being retained by a set screw or the like 38.

By rotating the gears 33, 34 and 35 the frame may be raised or lowered in relation to the surface of the soil, the action of which in turn regulates the depth of the furrow formed by the plow —P— and wheel plow —W—, and are adapted to be operated selectively or simultaneously through transmission arranged as follows:

Mounted in bearings 39 secured to the upper member 12 of the frame is a main drive shaft 40 adapted to be driven at a constant speed either by power furnished by the tractor designated at —T—, or an engine mounted on the frame, the main shaft also serves to transmit rotation to the wheel plow through suitable gearing generally designated at 41.

An endless chain 42 passes over a sprocket 43 secured to a countershaft 44, and a sprocket 45 rotatably mounted on said drive shaft, the latter sprocket being provided with jaws adapted to mesh with jaws formed on a clutch 46 slidably engaging a key on the main shaft.

Clutch 46 is connected to a pivotally mounted bar 47 which in turn is connected by a link 48 to a shift lever 49 provided with a dog 50 operated by a hand grip 51, and is adapted to selectively engage notches 52 and 53 formed in a strap 54 secured to the frame.

Secured to the forward end of the countershaft is a bevel gear 56 which meshes with a pair of bevel gears 57 and 58 rotatably mounted on a cross shaft 59 journalled in bearings 60 mounted on suitable supporting members 61, and secured to said shaft is a bevel gear 62 meshing with the gear 33.

Gears 57 and 58 are provided with jaws 63 adapted to be engaged by a jaw clutch 63ª slidably mounted on the shaft 59, the clutch is connected to one arm of a pivotally mounted quadrant 64, and connected to the other arm of the quadrant is a link 65 which in turn is connected to an operating lever 66 provided with a dog 68 adapted to selectively engage notches 69, 70 and 71 formed in a strap 72 secured to the frame work.

Secured to the countershaft 44 is a bevel gear 74 which meshes with a bevel gear 75 secured to a shaft 76 mounted in bearings 77, and secured to shaft 76 is a bevel gear 78 which meshes with bevel gears 79 and 80 rotatably mounted on a shaft 81 carried by bearings 82. A bevel gear 83 is secured to the end of the shaft 81 and meshes with the gear 34.

Gears 79 and 80 are provided with jaws 84 adapted to be engaged by a jaw clutch 85 slidably engaging a key (not shown) on the shaft 81, the clutch is connected to pivotally mounted arms 86, which in turn are connected by a link 87 to a lever 88 secured to the outer end of a rock shaft 89 mounted in bearings 90.

One end of a rod 92 is connected by a clevis 94 to an arm 95 secured to the rock shaft, the opposite end of said rod being connected to a pivotally mounted arm 96 provided with a latch 97 adapted to selectively engage notches 98, 99 and 100 formed in plate 101, the latch being operable by a usual hand grip 102.

The gear 74 also meshes with a gear 103 secured to a shaft 104 mounted in a bearing, and secured to the opposite end of said shaft is a gear 105 which meshes with gears 106 and 107 rotatably mounted on a shaft 108 carried by bearings 109. Secured to the end of shaft 108 is a bevel gear 110 which meshes with the gear 35.

Gears 106 and 107 are provided with jaws adapted to be engaged by a jaw clutch 111 connected to a pair of pivotally mounted arms 112, which in turn are connected to a rod 113 connected to a lever 114 secured to the outer end of a rock shaft 115 mounted in bearings 116.

Secured to the inner end of the rock shaft is a lever 117, and connected to the lever is a rod 118 which in turn is connected to a pivotally mounted arm 119, it being understood that the arm 119 is provided with a latch adapted to selectively engage notches formed in a plate of the same construction as plate 101.

From the foregoing, it will be seen that the gears 57 and 58, gears 79 and 80, and gears 106 and 107 will rotate in opposite directions, and that by shifting the clutches into engagement with the jaws on said gears, the gears 33, 34 and 35 may be rotated in either direction thereby the frame may be raised or lowered, or the wheels 20, 22 or 23 may be individually adjusted, it being understood that the jaw clutches are normally held in neutral or disengaged position.

Shaft 40 is formed in two sections designated at 40ª and 40ᵇ which are adapted to be engaged or disengaged by a clutch 122 consisting of a member 123 secured to the section 40ᵇ, and provided with teeth adapted to mesh with teeth formed on a member 124 slidably mounted on section 40ª and rotatable therewith, the member 124 being connected to a pivotally mounted shift lever 125. The clutch 122 is provided in order that the position of the frame may be adjusted without rotating the wheel plow.

Wheel plow —W— is rotatably mounted on a spindle 130 carried by hangers 131 rigidly mounted in the frame, and is provided with a plurality of shovels or scoops 132 disposed between side flanges 134, each of the shovels being preferably provided with a plurality of teeth 135.

Secured to the side wall or web 136 of the wheel plow is a bevel gear 138 which meshes with a pinion 139 secured to the lower end of a vertically disposed shaft 140 mounted in a bearing 141, and secured to the upper end of shaft 140 is a bevel gear 142 which meshes with a bevel gear 143 mounted on the section 40$^b$ of the main drive shaft 40. The gear and pinion are enclosed in a stationary housing 144 secured to the spindle.

As previously referred to, the drive shaft is preferably rotated by power supplied by the tractor, this is accomplished through a flexible connecting member generally designated at 145 consisting of universal joints 146 and 147 connected respectively to the drive shaft and power take-off shaft 148 of the tractor, each of said universal joints having bars 149 square shape in cross section projecting into a correspondingly shaped tube 150.

The frame is adapted to be connected to the tractor by a draw bar designated at 152, one end of which is connected to the usual yoke of the tractor, the opposite end being connected by a clevis 153 and pin 154 to a coupling member 155. The coupling member is secured to the frame by a bolt 156 extending through a slot 157 formed therein and threaded in an opening formed in a vertically disposed plate 158 extending between and secured to the members 12 and 14 of the frame. The slot permits adjustment of the coupling member so that the draw bar may be retained in a horizontal position when the frame is raised or lowered.

Mounted in the frame and disposed rearwardly of the wheel plow is a conveyor generally designated at —C— which serves to receive and transfer the soil removed by and discharged from the wheel plow into the furrow formed thereby during operation.

Conveyor —C— consists of an endless belt 160 passing over a drive pulley 161 and an idler 162, said pulleys being mounted on shafts 163 and 164 respectively, mounted in bearings carried by suitable supporting members 165 secured to the frame.

Belt 160 is disposed in a slightly inclined plane between side members 166, and is preferably provided with a plurality of slats 160$^a$ which serve to aid in moving the material discharged thereon. The belt is adapted to move at a constant speed in feet per minute through rotation of the drive pulley 161; this is accomplished by an endless chain 167 passing over a sprocket 168 secured to the section 40$^b$ of the main drive, and a sprocket 169 secured to the shaft 163 of the conveyor.

The plow —P— is rigidly secured to the lower members 14 of the frame by a bar 170, and is so constructed that it will turn the soil over in one direction, in the present instance, to the right when facing the rear end of the apparatus, as shown in Fig. 3.

Operation: The apparatus is connected to the tractor, the center wheel 20, and side wheels 22 and 23 are then adjusted so that the frame rests in an upright position with the plow —P—, and wheel plow —W— disposed below the surface to form furrows of required depth.

This is accomplished by engaging the clutch 46 with sprocket 45, disengaging members 123 and 124 of clutch 122, then selectively shifting the jaw clutches 63$^a$, 85 and 111 into engagement with the jaws of the gears on the shafts 59, 81 and 108. The clutch or gear of the tractor which transmits rotation to the power take-off shaft 148 is then engaged, the action of which in turn transmits rotation to shafts 40$^a$, 59, 44, 76 and 104, resulting in raising or lowering of wheels 20, 22 and 23 through screws 26, 27 and 28 according to the respective engagements of clutches 63$^a$, 85 and 111 with the gears 57, 58, 106, 107, 79 or 80, it being noted that while making the above adjustment the wheel plow remains stationary.

After making the necessary adjustment above referred to, the clutch 46 is disengaged and the clutch 122 engaged, the action of which transmits rotation to the wheel plow —W—, which is arranged to rotate in the direction indicated by the arrow 172.

The soil changing plow is then drawn over the soil by the tractor. During the first round, or path traversed, the plow —P— forms a furrow indicated at 174 in Fig. 6, and turns the top soil indicated at 175 to one side, while the wheel plow forms a furrow of greater depth indicated at 176 in Fig. 7. The bottom soil, designated at 177, removed by the wheel plow is discharged onto the belt 160 of the conveyor —C—, which in turn discharges it on top of the soil turned over by the plow —P—.

During the second round of operation the plow —P— turns the top soil indicated at 178 into the furrow 176 formed by the wheel plow during the first round, as shown in Fig. 8. The wheel plow —W— then forms a furrow indicated at 179 in Fig. 9, and the soil indicated at 180 removed thereby is discharged on top of the soil 178. During the subsequent rounds the side wheel 23 is raised to a position so that it will rest on and roll over the surface of the soil turned over during the preceding round. The above operations are repeated until the area required to be reconditioned is covered. It will be understood that the position of the supporting wheels may be adjusted during operation according to the condition of the surface encountered.

After completing the soil changing operation, the frame is adapted to be raised so that the plow —P— and wheel plow —W— will be in a position above the surface of the soil. This is accomplished by engaging the clutch 63ª with gear 58, clutch 111 with gear 107, and clutch 85 with gear 79, then engaging the clutch 46 with gear 45, and disengaging clutch 124 with member 123, then rotating the drive and countershaft through the power take-off shaft of the tractor, the action of which transmits left hand rotation to the gears 33, 34, and 35 resulting in raising the frame.

I claim:

1. An apparatus of the character described comprising a portable frame, a plow for turning the top soil over in one direction secured to said frame, an excavator mounted in said frame rearwardly of and arranged to remove soil at greater depth than said plow, and a conveyor carried by said frame for receiving the soil removed by said excavator and discharging it on top of the soil turned over by the plow.

2. An apparatus of the character described comprising a frame, a plow rigidly mounted in said frame, an excavator mounted in said frame rearwardly of and arranged to increase the depth of the furrow formed by said plow, a conveyor mounted in said frame rearwardly of said excavator, and transmission carried by said frame for simultaneously operating said excavator and conveyor.

3. An apparatus of the character described comprising a portable frame, a plow secured to said frame, an excavator mounted in said frame rearwardly of said plow, a conveyor carried by said frame for receiving and transferring soil removed by said excavator and discharging it on top of the soil turned over by said plow, and means for operating said excavator and conveyor.

4. An apparatus of the character described comprising a frame, wheel supporting said frame, a plow secured to said frame adapted to form a furrow and turn the soil over in one direction, an excavator mounted in said frame rearwardly of and arranged to increase the depth of the furrow formed by said plow, a conveyor carried by said frame for receiving and transferring soil removed by said excavator and discharging it on top of the soil turned over by said plow, means for operating said excavator, means for operating said conveyor, and means interconnected with said supporting wheels and frame, whereby the furrow formed by said plow and excavator may be varied.

5. An appartus of the character described comprising a frame, a plow rigidly mounted in said frame, an excavator mounted in said frame and disposed rearwardly of said plow, a conveyor mounted in said frame rearwardly of said excavator, and transmission carried by said frame, said transmission operatively connected to said excavator and adapted to be connected to a source of power for imparting rotation thereto.

6. An apparatus of the character described comprising a frame, a center wheel supporting said frame adjacent its forward end, a pair of wheels supporting said frame adjacent its rear end, means for individually adjusting said supporting wheels, a plow rigidly mounted in said frame rearwardly of said center wheel adapted to form a furrow and turn the soil over to one side, a rotary excavator mounted in said frame and adapted to increase the depth of the furrow formed by said plow, a conveyor mounted in said frame arranged to receive and transfer the soil removed by said excavator and discharge it on top of the soil turned over by said plow, means for rotating said excavator and means for operating said conveyor.

In testimony whereof I affix my signature.

WALTER C. STUMPF.